April 27, 1954     B. L. SIMPSON     2,676,760
PORTABLE MULLING MACHINE
Filed Jan. 27, 1951     2 Sheets-Sheet 2
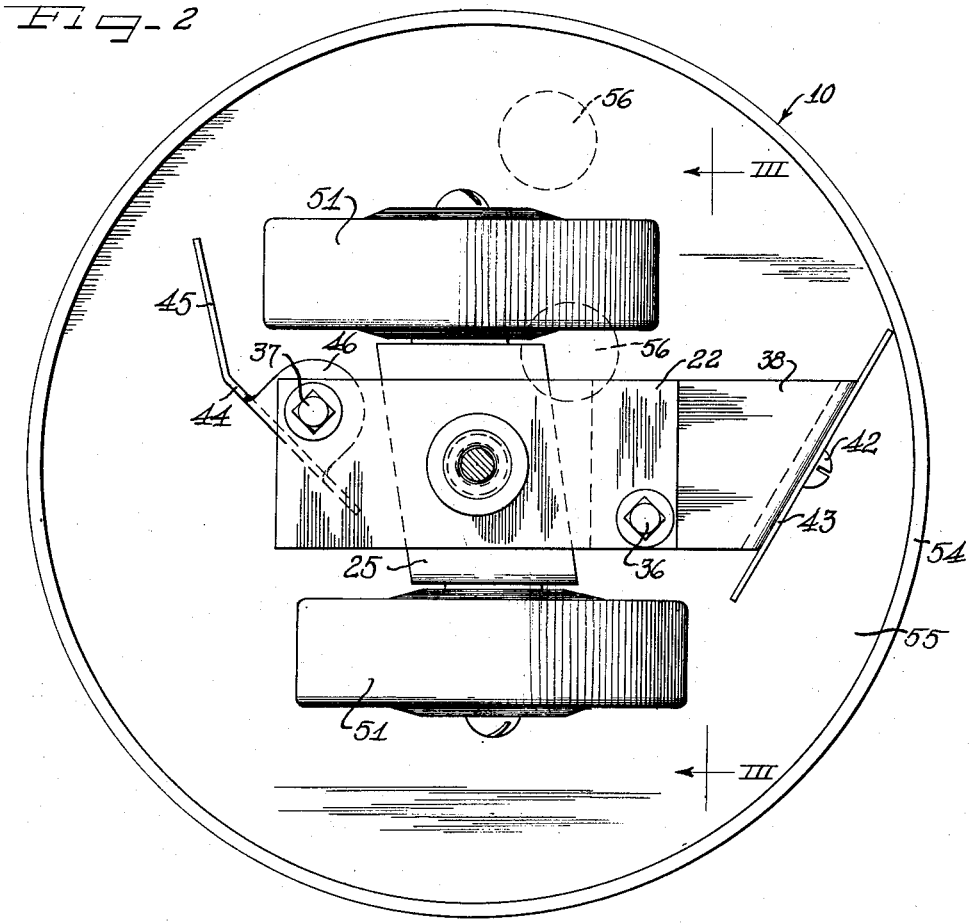
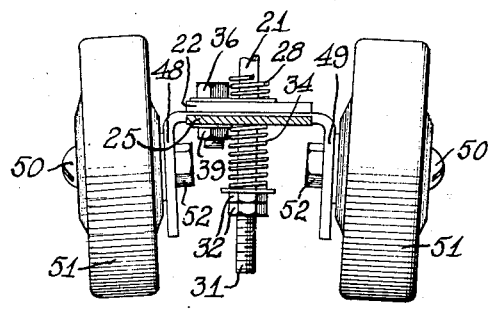
Inventor
Bruce L. Simpson Patented Apr. 27, 1954

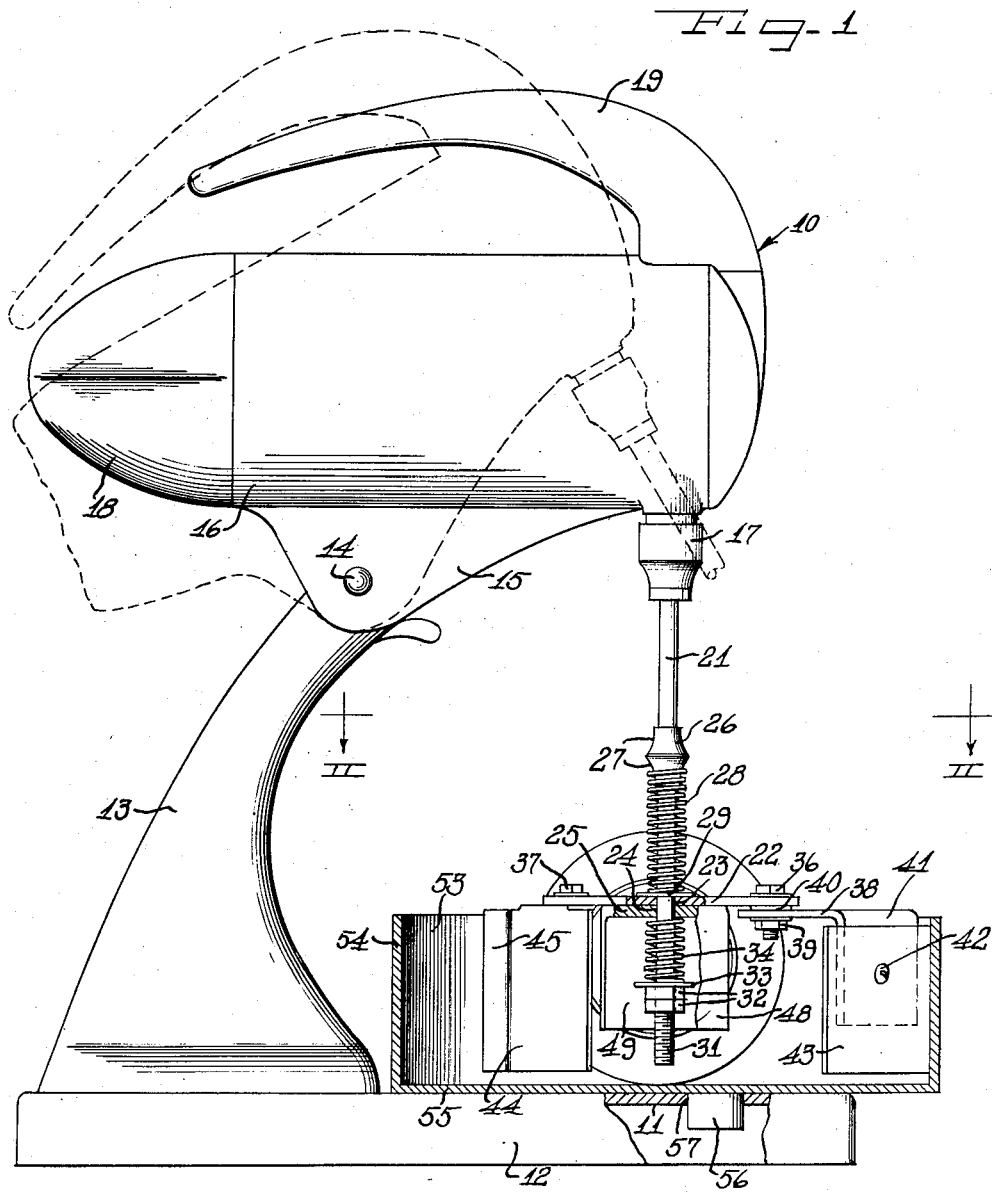

2,676,760

UNITED STATES PATENT OFFICE 2,676,760

PORTABLE MULLING MACHINE

Bruce L. Simpson, Kenilworth, Ill., assignor, by mesne assignments, to Herbert Simpson Corporation, Chicago, Ill., a corporation of Illinois Application January 27, 1951, Serial No. 208,182

7 Claims. (Cl. 241—127)

There has long been a need in the mulling art for an inexpensive, portable, lightweight mulling and mixing machine for the preparation of relatively small batches of sand or similar pulverized material for laboratory, or other small scale use. Since the conventional production-type mulling machines are provided with massive mulling wheel and complicated drive mechanisms, it is not feasible to merely reduce the size of such prior art devices, and accordingly makeshift means have heretofore been utilized where relatively small batches are concerned. This condition has greatly hindered research and laboratory workers and others interested in the preparation of relatively small sample batches of carefully prepared molding mixtures or the like under conditions which accurately simulate those of actual commercial large scale operations.

The present invention now provides a simple, inexpensive, lightweight and portable mulling machine which fulfills the needs of small batch operation without the prohibitive cost of the larger production machines and also without necessitating the preparation of excessively large batches of material. In addition, the device of the present invention is provided with a novel drive mechanism carefully designed with the specific needs of portable machines in mind.

It is, therefore, an important object of the present invention to provide an improved portable mulling machine for the preparation of relatively small batches of molding material.

Another important object of the present invention is the provision of a mulling machine utilizing a standardized drive mechanism for rotatably driving a pair of mulling wheels and a scraper assembly, the drive mechanism and the mulling mechanism being tiltably mounted for movement from an operative mulling condition to an inoperative condition at which the prepared molding mixture may be removed from the machine.

Still another important object of the present invention is the provision of an improved sand mulling machine having a tiltably mounted drive mechanism including counterbalanced resilient means operably connecting the drive mechanism to a mulling and mixing assembly.

It is a further object of the present invention to provide a portable mulling machine including an overhead drive mechanism including a depending driving shaft having a mulling and mixing assembly carried thereby for rotation relative to the shaft and rotatably connected thereto by means of counterbalanced variable-tension resilient means.

An unusual feature of the present invention is the utilization of a standardized drive and gear reduction mechanism, such as that employed in conventional kitchen-type mixing devices and having a rotatable shaft freely rotatable with respect to a mulling and mixing assembly located intermediate the length of the shaft. The mulling and mixing assembly is adapted for rotation with the shaft by means of a pair of counterbalanced spiral springs acting upon a cross-head. The drive of the cross-head is thus accomplished through the spring means which serves as a slip clutch, so that the springs may resiliently accommodate an interruption of the rotation of the cross-head without imposing an undue load upon the drive mechanism. In other words, the driving shaft may rotate relative to the cross-head upon any hindrance of cross-head rotation without imposing an undue burden upon the drive mechanism.

Therefore, it is an additional object of the present invention to provide a mulling machine having a rotatable shaft driven by a suitable drive mechanism and a cross-head mounted on the shaft for rotative movement relative thereto, spring means being interposed between and establishing a driving connection between the drive shaft and the cross-head.

Yet another important object of the present invention is to provide a muller including a drive mechanism having a gear reduction unit associated therewith for driving a rotatable shaft, a cross-head located on the shaft for rotative movement relative thereto and a counterbalanced spring means establishing a driving connection between the shaft and the cross-head, while resiliently accommodating interruption of cross-head movement without imposing an undue burden upon the mechanism driving the shaft.

Other and further important objects of this invention will be apparent from the disclosures in the specification and the accompanying drawings.

On the drawings:

Figure 1 is a side elevational view, with parts broken away and in sections illustrating a portable mulling machine of the present invention;

Figure 2 is a fragmentary sectional view taken along the plane II—II of Figure 1 and illustrating the cross-head structure of the mulling machine; and Figure 3 is a sectional view taken along the plane III—III of Figure 2 further illustrating the cross-head structure and the drive mechanism therefor.

As shown on the drawings:

In Figure 1 reference numeral 10 refers generally to a portable mulling machine of the present invention including a stationary base 11, a downturned marginal flange 12 for supporting the base in spaced relation to a plane floor surface. The base 11 carries an upstanding, forwardly projecting, fixed pedestal 13 pivotally attached at its free upper end, as at 14, to a depending boss 15 formed integrally with, or secured to a driving head 16. The head 16 forms a housing for a driving means, preferably an electric motor, and an associated speed reducer drive for rotating a depending drive socket 17 overlying the floor 11. The drive head 16 carries a rearwardly projecting speed control knob 18 and a curved carrying handle 19 projects rearwardly from the forward portion of the drive head. The structure of the base 11, the upstanding post 13 and the drive head 16 with its associated controls is similar to the driving mechanism of conventional kitchen mixers, or like devices.

The drive socket 17 receives therein a depending drive shaft 21 which is keyed to or otherwise rotatable with the drive shaft of the driving head 16. Such keyed driving shafts are, of course, well known in the art and numerous types of key or spline mechanisms may be utilized in this connection.

The drive shaft 21, intermediate its length, is received by an upper cross-plate 22 of a scraper cross-head having a central aperture 23 freely receiving the shaft therethrough and registering with a similar aperture 24 formed in a muller cross-head plate 25. The shaft intermediate the driving head 16 and the scraper cross-plate 22 is provided with a stop member 26 having oppositely directed concave exterior surfaces 27.

A spiral compression spring 28 is resiliently interposed between the stop member 26 and the scraper plate 22, the spring 28 actually being bottomed against a washer 29 abutting the upper surface of the scraper plate, and the upper end of the spring being bottomed against the lower concave surface 27 of the stop or abutment member 26. The depending free end of the drive shaft 21 is threaded, as at 31, for reception of a pair of lock nuts 32 threaded thereon and adjustable axially along the length of the shaft to vary the position of a washer or abutment 33 abutting the uppermost of the lock nuts 32 and serving to confine a lower compression spring 34 against the undersurface of the muller cross-head plate 25.

The cross-head structure, including the muller cross-head plate 25 and the scraper cross-plate 22, is thus resiliently suspended between the springs 28 and 34 with the tension upon the springs being variable by threading of the nuts 32 to a greater or lesser extent upon the threaded end 31 and the shaft 21. The apertures 23 and 24 formed in the plates 22 and 25 freely receive the corresponding portions of the shaft 21 therethrough, so that there is no direct drive connection of the shaft across said structure and any drive imparted to the cross-head is accomplished through the springs 28 and 34. The springs also urge the plates 22 and 25 into surface engagement.

The plane scraper cross-plate 22 (best seen in Figure 2 is generally rectangular in configuration and diagonally opposed corner portions of this plate carry depending bolts 36 and 37, respectively. The bolt 36 extends through the plate 22 and through a registering aperture formed in a scraper arm 38 to receive a nut 39 thereon retaining the scraper arm in pivotally adjusted position. The washer 40 is interposed between the arm 38 and the plate 22, so that the arm may be freely adjusted pivotally with respect to the plate when the nut 39 is loosened. The arm 38 is provided with a terminal downturned flange 41 which carries by means of a screw 42 a depending generally rectangular scraper blade 43.

The nut 37 similarly extends through the plate 22 to carry a second depending inner scraper arm 44 having an offset terminal flange 45 and a laterally extending flange 46 directly receiving the bolt 37 and pivotally adjustable relative to the plate 22. It will be seen that, upon loosening of the bolt 37, the scraper arm 44 may also be pivotally adjusted for extending to a greater or lesser extent radially of the plate 22.

The muller cross-head plate 25 is provided with downturned marginal flanges 48 and 49 which are apertured to receive axle bolts 50 extending axially through and supporting for rotation muller wheels 51. Bolt nuts 52 provide means for removably attaching the axles 50 and the wheels 51 to the cross-head flanges 48 and 49, and it will be seen that upon rotation of the cross-head, the wheels 51 are rotated about the bolts as axles.

The driving head assembly of the mulling apparatus, including the plates 22 and 25, the scrapers 43 and 44 and the wheels 51, is rotatable within a material-receiving space 53 defined by a mulling pan 54 having a bottom bedplate 55 seated upon the base 11 in extended surface contact therewith. The pan 54 is prevented from rotating by a pair of depending pins 56 carried on the undersurface of the bedplate 55 depending into apertures 57 formed in the base plate 11. A pair of pins 56 are provided so that any possibility of rotation of the pin 54 is obviated.

It will thus be seen that the present invention comprises an extremely simple structure which is adapted for mulling and mixing material disposed in the pan 54. The mulling mechanism includes a rotatable shaft 21 driven by the power head 16 and driving the cross-head structure through the counterbalanced torque transmitting spring means 28 and 34. Tension upon the spring means is variable by means of the lock nuts 32 and by means of this adjustment the slippage between the drive shaft 21 and the muller cross-head may be varied at will. The reason for this slippage will be readily apparent to those skilled in the art, inasmuch as if either the scraper or the mulling wheels meet an obstruction in the material being mulled, the cross-head may be entirely stopped from rotation without imposing a greatly increased load upon the drive shaft 21. The cross-head merely stops rotating until the obstruction has been removed, thus preventing damage to the driving mechanism.

In this manner a very light driving mechanism may be utilized for operation at relatively low speeds without the possibility of damaging the same upon the presentation of unexpected obstacles to rotation of the cross-head structure.

In addition, the counterbalanced spring means 28 and 34 again provide means for varying the downward thrust of the mulling wheels 51. In this manner, effective mulling weight of the wheels may be varied throughout a relatively wide range without providing the usual complicated counterbalancing or weight-adding structure.

During the loading or unloading of the mulling pan 54, the power head 16, the driving shaft 21 and the entire mulling structure carried thereby may be tilted about the pivot pin 14 to the dotted position illustrated in Figure 1. When the device has been tilted to its position, the pan 54 is entirely free of the mulling structure, and then this pan may be lifted from its seating position upon the base 11 to empty the same by a simple manual procedure. Thus, a complicated pan-emptying mechanism is unnecessary, and any interference of loading or unloading of the pan by the muller mechanism is eliminated. Similarly, the removal of obstructions from the path of the mulling wheels or scrapers is accommodated by this tilting movement of the power head and the mulling structure carried thereby.

It will be understood that modifications and variations may be effected without departing from the scope of the novel concepts of the present invention.

I claim as my invention:

1. In a portable mulling machine, a drive shaft having a drive end and a driven end, an abutment member carried by said shaft intermediate the ends thereof, a first spiral compression spring surrounding a portion of the driven end of said drive shaft adjacent said abutment member and having one end bottomed against said abutment member, a cross-head having a central aperture freely receiving said shaft therethrough and opposing the other end of said first spring, a further compression spring surrounding a portion of the driven end of said shaft beyond said cross-head and having an end opposed by said cross-head, said shaft driven end having a threaded terminal portion, a nut threaded onto said terminal portion to adjustably bottom the other end of said further spring, muller wheels rotatably carried by said cross-head, and scraper arms carried by said cross-head in spaced angular operative relation to said muller wheels.

2. In a portable mulling machine, a drive shaft having a drive end and a driven end, an abutment member carried by said shaft intermediate the ends thereof, a first spiral compression spring surrounding the driven end of said drive shaft adjacent said abutment member and having one end bottomed against said abutment member, a scraper cross-head plate and a muller cross-head plate having aligned apertures freely receiving said shaft therethrough to define a cross-head relatively rotatably mounted on said shaft and opposing the other end of said first spring, a further compression spring surrounding the driven end of said shaft beyond said cross-head and having an end opposed by said cross-head, said shaft driven end having a threaded terminal portion, a nut threaded onto said terminal portion to adjustably bottom the other end of said further spring, muller wheels rotatably carried by said muller plate, and scraper arms carried by said scraper plate.

3. In a portable mulling machine, a drive shaft having a drive end and a driven end, an abutment member carried by said shaft intermediate the ends thereof, a compression spring surrounding the driven end of said drive shaft and having one end bottomed by said abutment member, a muller cross-head having a central aperture freely receiving said shaft therethrough and bottoming the other end of said spring, a further compression spring surrounding the driven end of said shaft beyond said cross-head and having an end bottomed by said cross-head, said shaft driven end having means for adjustably bottoming the other end of said further spring, muller wheels rotatably carried by said cross-head and scraper arms carried by said cross-head in spaced angular operative relation to said muller wheels.

4. In a portable mulling machine, a drive shaft having a drive end and a driven end, an abutment carried by said shaft intermediate the ends thereof, a compression spring surrounding the driven end of said drive shaft and having one end thereof bottomed by said abutment, a cross-head having a central aperture freely receiving said shaft therethrough and bottoming the other end of said spring, a further compression spring surrounding the driven end of said shaft beyond said cross-head and having an end bottomed by said cross-head, and further abutment means carried by said shaft for bottoming the other end of said further spring.

5. A portable mulling machine comprising a base, a crib carried by said base for retaining material to be mulled, a cross head positioned in said crib, mulling wheels carried by said crosshead for mulling said material, said head having a centrally located aperture therein, a drive shaft projecting freely through the cross-head aperture, a pair of abutments carried by said drive shaft one on either side of said crosshead, a compression spring surrounding said shaft and extending between said cross-head and one of said abutments, and a further spring surrounding said shaft and extending between said cross-head and said other abutments for affording a driving connection between said shaft and said cross-head while accommodating relative rotation therebetween upon predetermined resistance to rotation of said muller wheels in said crib.

6. In a portable muller, a supporting structure extending from a mulling platform, power actuated driving means carried by said structure over the platform, a muller receptacle to one side of the structure on the platform, a driven muller shaft depending from said driving means toward said platform and swingable upwardly and away from said receptacle, mulling means carried and driven by said shaft and torque transmitting means drivingly connecting said shaft to said mulling means and for also contemporaneously pressing the mulling means into mulling engagement with the receptacle, said mulling means being swingable with said shaft out of engagement with the receptacle and upwardly and laterally out of the receptacle.

7. In a portable muller, a supporting structure extending from a mulling platform, power actuated driving means carried by said structure over the platform, a muller receptacle to one side of the structure on the platform, a driven muller shaft depending from said driving means toward said platform and swingable upwardly and away from said receptacle, mulling means carried and driven by said shaft and torque transmitting means operatively connecting said shaft to said mulling means and for pressing the mulling means into mulling engagement with the receptacle, said mulling means being swingable with said shaft out of engagement with the receptacle and upwardly and laterally out of the receptacle, said connecting means comprising spring means through which said shaft is drivingly connected to said mulling means.

References Cited in the file of this patent

UNITED STATES PATENTS

| Number | Name | Date |
|---|---|---|
| 786,294 | Joy | Apr. 4, 1905 |
| 1,126,780 | Jones | Feb. 2, 1915 |
| 1,203,820 | Wales | Nov. 7, 1916 |
| 1,402,914 | Trust et al. | Jan. 10, 1922 |
| 1,864,209 | Meeker | June 21, 1932 |
| 1,953,510 | Schultz | Apr. 3, 1934 |
| 2,070,768 | Wright | Feb. 16, 1937 |
| 2,214,901 | Griffin | Sept. 17, 1940 |
| 2,334,363 | Vann | Nov. 16, 1943 |
| 2,368,897 | Strauss | Feb. 6, 1945 |
| 2,450,299 | Piper | Sept. 28, 1948 |
| 2,461,176 | Piper | Feb. 8, 1949 |